US005969043A

United States Patent [19]

Maruta et al.

[11] Patent Number: 5,969,043

[45] Date of Patent: Oct. 19, 1999

[54] POWDER COATING OF EPOXY RESIN AND EPOXIDIZED POLYDIENE BLOCK POLYMER

[75] Inventors: Riichiro Maruta; Takako Watanabe; Yojiro Yamamoto, all of Yokkaichi, Japan

[73] Assignee: Shell Oil Company, Houston, Tex.

[21] Appl. No.: 09/054,578

[22] Filed: Apr. 3, 1998

[30] Foreign Application Priority Data

Apr. 3, 1997 [JP] Japan .................................... 9-118565

[51] Int. Cl.[6] ............................ C08L 53/00; C08L 53/02; C08L 63/02; C08L 63/04

[52] U.S. Cl. ........................ 525/92 H; 525/314; 525/316

[58] Field of Search ................................. 525/92 H, 314, 525/316

[56] References Cited

U.S. PATENT DOCUMENTS

| | | | |
|---|---|---|---|
| 5,290,857 | 3/1994 | Ashida et al. | 525/65 |
| 5,332,783 | 7/1994 | Dillman et al. | 525/113 |
| 5,499,409 | 3/1996 | St. Clair | 525/92 H |
| 5,721,316 | 2/1998 | Masse et al. | 525/92 H |

FOREIGN PATENT DOCUMENTS

| | | |
|---|---|---|
| 5-25366 | 2/1993 | Japan . |
| 6-322139 | 11/1994 | Japan . |
| 7-53855 | 6/1995 | Japan . |

*Primary Examiner*—Robert E. Sellers

[57] ABSTRACT

An epoxy resin composition for powder coatings which comprises (a) 40 to 95 parts by weight of a solid epoxy resin having at least two epoxy groups in a molecule, an epoxy equivalent of 400 to 2500, and a softening point of 50° C. to 150° C., and (b) 5 to 60 parts by weight of an epoxidized polydiene polymer having a main structure of general Formula (I) in which aliphatic double bonds are partially epoxidized. Formula (I) is $$(A—B—Ap)n—Yr—(Aq—B)m \qquad (I)$$

in which Y is a coupling agent, a monomer for coupling, or an initiator, A is a polymer block selected from a homopolymer block of a conjugated diolefine monomer, a copolymer block of a conjugated diolefine monomer, a copolymer block composed of a conjugated diolefine monomer and an aromatic hydrocarbon monomer having one alkenyl group, B is a polymer block selected from a homopolymer block of an aromatic hydrocarbon monomer having one alkenyl group or a copolymer block thereof, or a copolymer block composed of an aromatic hydrocarbon having one alkenyl group and a conjugated diolefine monomer, n is not less than 0, r is 0 or 1, and m is 0 or more, the total of n and m is 1 to 100, and p and q are 0 or 1).

16 Claims, No Drawings

POWDER COATING OF EPOXY RESIN AND EPOXIDIZED POLYDIENE BLOCK POLYMER

FIELD OF THE INVENTION

The present invention relates to an epoxy resin composition for powder coatings which is employed as powder coatings for materials in engineering and construction, home electric appliances, heavy electricity equipments, materials for roads, steel furniture, parts for automobiles, and materials for water supplying, etc.

BACKGROUND OF THE INVENTION

Heretofore, a powder coating which primarily contains an epoxy resin and a curing agent therefor has been employed in the above-mentioned fields, and although it is generally excellent in chemical resistance, adhesion, and surface hardness, etc., it has a weak point of poor flexibility and poor impact resistance.

SUMMARY OF THE INVENTION

Therefore, the present inventors, as a result of an intensive investigation aiming at development of an epoxy resin for powder coatings which can provide a coating layer improved in flexibility and impact resistance without loss of chemical resistance, adhesion, and surface hardness, etc. which are characteristics in epoxy resin-based powder coatings, have found an epoxy resin composition for powder coatings to complete the present invention.

The present invention relates to an epoxy resin composition for powder coatings which comprises (a) 40 to 95 parts by weight of a solid epoxy resin having at least 2 epoxy groups in a molecule, an epoxy equivalent of 400 to 2500, and a softening point of 50° C. to 150° C., and (b) 5 to 60 parts by weight of an epoxidized polydiene polymer having a main structure of Formula (I):

$$(A—B—Ap)n—Yr—(Aq—B)m \qquad (I)$$

in which aliphatic double bonds are partially epoxidized wherein Y is a coupling agent, a monomer for coupling, or an initiator, A is a polymer block selected from a homopolymer block of a conjugated diolefine monomer, a copolymer block of a conjugated diolefine monomer, a copolymer block composed of a conjugated diolefine monomer and an aromatic hydrocarbon monomer having one alkenyl group, B is a polymer block selected from a homopolymer block of an aromatic hydrocarbon monomer having one alkenyl group or a copolymer block thereof, or a copolymer block composed of an aromatic hydrocarbon having one alkenyl group and a conjugated diolefine monomer, n is not less than 0, r is 0 or 1, and m is 0 or more and the total of n and m is 1 to 100, and p and q are 0 or 1.

DETAILED DESCRIPTION OF THE INVENTION

In the composition of the present invention, a solid epoxy resin which is the component (a) is an epoxy resin having at least 2 epoxy groups in a molecule, an epoxy equivalent of 400 to 2500, preferably 500 to 2000 and, further, a softening point of 50° C. to 150° C., preferably 70° C. to 130° C.

In the case that the epoxy equivalent is less than 400, stability of the powder coatings becomes poor in preparation and storage and, on the other hand, in the case that it exceeds 2500, desired properties become not obtained in a corrosion resistance and chemical resistance, etc. of a cured coating layer in the coatings.

Further, in the case that the softening point is less than 50° C., the powder coatings readily cause blocking during its storage and, on the other hand, in the case that it exceeds 150° C., thermal fluidity becomes poor when the powder coatings are heated and cured, resulting in that a smooth coating layer is not obtained.

As a process for the preparation of the solid epoxy resin, there are a process (alias one step process) in which an aromatic compound having at least 2 hydroxyl groups is allowed to react with epichlorohydrin under alkaline reaction conditions, and then modified by glycidylether and a process (alias two steps process) by allowing to highly-polymerize until a desired molecular weight according to an addition polymerization of an epoxy resin having a relative low molecular weight which has at least 2 epoxy groups, an epoxy equivalent of 160 to 400, and a molecular weight of 300 to 800 with an aromatic compound having at least 2 hydroxyl groups in the presence of a catalyst.

As typical examples of the aromatic compound having at least 2 hydroxyl groups, a bisphenol-based compound is exemplified, for example, which includes 2,2'-bis(4,4'-hydroxyphenyl)propane(alias bisphenol A), a halogenated bisphenol A, 2,2'-bis(4,4'-hydroxyphenyl)methane(alias bisphenol F), 2,2'-bis(4,4'-hydroxyphenyl)ethane,2,2'-bis(4,4'-hydroxyphenyl)sulfone(alias bisphenol S). Further, there can be also employed a novolak resin of an alkyl-phenol such as a phenol-novolak resin and a cresol-novolak resin, and a novolak resin, etc. of bisphenol A.

As specific examples of the solid epoxy rein which is the component (a) by the one step process, there are EPIKOTE 1001 (an epoxy equivalent of 450 to 500), EPIKOTE 1002 (an epoxy equivalent of 600 to 700), EPIKOTE 1003 (an epoxy equivalent of 670 to 770), EPIKOTE 1004 (an epoxy equivalent of 875 to 975), and EPIKOTE 1007 (an epoxy equivalent of 1750 to 2200) which are trade names manufactured by Yuka Shell Epoxy Co. Ltd., respectively, which are obtained by a reaction of bisphenol A with epichlorohydrin under alkaline reaction conditions.

Further, as specific examples of the solid epoxy resin which is the component (a) by the two steps process, there are EPIKOTE 1003F (an epoxy equivalent of 700 to 800), EPIKOTE 1004F (an epoxy equivalent of 875 to 975), and EPIKOTE 1005F (an epoxy equivalent of 950 to 1050), etc., which are trade names manufactured by Yuka Shell Epoxy Co. Ltd., respectively, and which are obtained by an addition polymerization of a bisphenol A type epoxy resin having a low molecular weight (a trade name: EPIKOTE 828, etc. manufactured by Yuka Shell Epoxy Co. Ltd.) with bisphenol A in the presence of a catalyst. Still further, there is also a copolymerized type epoxy resin, etc. which is obtained by an addition polymerization of the bisphenol A type epoxy resin having a low molecular weight with bisphenol A, together with a phenol-novolak resin, an alkylphenol-novolak resin, bisphenol A-novolak resin, or a glycidylether-modified product of the novolak resins which are a third component in the presence of a catalyst.

As the catalysts in the two steps process, there are employed an inorganic alkali such as sodium hydroxide, potassium hydroxide, and sodium carbonate, a phosphorus-based compound such as triphenylphosphine, and amine-based compound such as a trialkylamine and a tetralkylammonium halide, etc.

The epoxidized polydiene polymer which is the component (b) can be obtained by epoxidation of a polydiene polymer having aliphatic double bonds. The polydiene polymer having aliphatic double bonds can be obtained by a copolymerization of one or more of an olefin compound, particularly, a diolefin compound, or by a copolymerization of a diolefin with one or more of an aromatic hydrocarbon monomer having alkenyl groups. The copolymer may be a random copolymer, a block copolymer, and the combination thereof. The polydiene polymers having aliphatic double bonds are prepared by an anion polymerization initiator (or a catalyst).

The polydiene polymers are obtained by a bulk polymerization, solution polymerization, and emulsion polymerization. The polydiene polymers are obtained in a state of powder, a solid of small particles, and a liquid. The polydiene polymers having aliphatic double bonds can be also purchased from some makers.

In general, in the solution anion polymerization, an anion polymerization initiator, for example, there are employed metals in IA group, alkyl compounds thereof, amide compounds, silanolate compounds, naphthalide compounds, biphenyl compounds, and anthracenyl compounds, etc., and the polydiene polymer having aliphatic double bonds is obtained by simultaneously or successively polymerizing the diolefin monomer and the aromatic hydrocarbon monomer having alkenyl groups. The polymerization reaction is carried out at a temperature ranging from approximately −150° C. to approximately 300° C., preferably from approximately 0° C. to 100° C. in an appropriate solvent. As the anion polymerization initiator, organic alkaline metal compounds are preferred and, particularly, organic lithium compounds are preferred which are represented by the following formula, $$RLin$$

wherein, R is an aliphatic hydrocarbon, a cycloaliphatic hydrocarbon, an aromatic hydrocarbon or an aromatic hydrocarbon substituted by alkyl groups which have a carbon atom number of 1 to 20, and n is an integer of 1 to 4.

Conjugated diolefins employed in the anion polymerization have a carbon atom of 4 to 24, and as specific examples, there are 1,3-butadiene, isoprene, piperylene, methylpentadiene, phenylbutadiene,3,4-dimethyl-1,3-hexadiene, and 4,5-diethyl-1,3-octadiene, etc. Of those, isoprene and butadiene are preferred in view of relatively stable prices and easiness of obtaining. The aromatic hydrocarbon monomer having alkenyl groups employed in the copolymerization includes a vinylaryl compound such as styrene, a styrene substituted by a variety of alkyl groups, vinylnaphthalene, and vinylnaphthalene substituted by alkyl groups.

The polydiene polymer having aliphatic double bonds obtained is partially hydrogenated before epoxidation so that 0.1 to 3 milli-equivalent of aliphatic double bonds are remained based on 1 g of the polymer.

The polymer partially hydrogenated is epoxidized by a general method with an organic peracid. As preferred organic peracids, peracetic acid and perbenzoic acid are employed.

Further, in an epoxidation reaction system, the organic peracids can be also in situ produced from hydroperoxide and organic acids having a low molecular weight such as formic acid.

Otherwise, the organic peracids can be also produced from hydroperoxide and acetic acid or acetic anhydride in the presence of a cation exchange resin. In the method, the cation exchange resin can be replaced with sulfuric acid or p-toluene sulfonic acid.

The epoxidation reaction can be also directly carried out in the polymer solution after polymerization of a polymer, or the epoxidation can be also carried out after dissolving again the polymer into an inert solvent such as toluene, benzene, hexane, cyclohexane, and methylene chloride. Further, the epoxidation can be also carried out in the absence of a solvent. The epoxidation is carried out at a temperature of approximately 0° C. to 130° C. and a reaction period of 0.1 to 72 hours. In the case that hydroperoxide and acetic acid are employed in the presence of sulfuiric acid which is a catalyst, a product is a mixture composed of epoxides and hydroxy esters. In the case that a peroxide and formic acid are employed in the presence of a strong acid, there is produced a polydiene polymer having both of epoxy groups and hydroxyester groups. Since side reactions are caused because of the presence of acids, the epoxidation reaction is desirably carried out at a temperature as low as possible and a period as short as possible until attaining to a desired epoxidation ratio. Still further, the epoxidation can be also carried out by a treatment of the polymer with hydroperoxide in the presence of transition metals such as Mo, W, Cr, V, and Ag. In addition, the epoxidation can be also carried out by a direct oxidation of the aliphatic double bonds with oxygen in the presence of tetracyanoethylene.

The oxidation method is appropriately carried out at the temperature of approximately 150° C. and the pressure of 58 atmospheres which are partial pressure of oxygen.

Thus-prepared epoxidized polydiene polymer is represented by the following formula, Formula (I)

$$(A—B—Ap)n—Yr—(Aq—B)m \qquad (I)$$

In Formula I, Y is a coupling agent, a monomer for coupling, or an initiator. A is a polymer block selected from a homopolymer block of a conjugated diolefine monomer, a copolymer block of a conjugated diolefine monomer, a copolymer block composed of a conjugated diolefine monomer and an aromatic hydrocarbon monomer having an alkenyl group. B is a homopolymer block of an aromatic hydrocarbon monomer having an alkenyl group or a copolymer block thereof, or a polymer block composed of an aromatic hydrocarbon having an alkenyl group and a conjugated diolefine monomer. In Formula I, n is not less than 0, r is 0 or 1, and m is 0 or more, and the total of n and m is 1 to 100, and p and q are each 0 or 1.

In the epoxidized polydiene polymer, the aliphatic double bonds are partially epoxidized, and the polymer has 0.1 to 3 milli-equivalent of epoxy groups based on 1 g of the polymer. In the case of not more than 0.1 milli-equivalent, mechanical properties cannot be sufficiently obtained in a coating layer and, in the case of not less than 3 milli-equivalent, storage stability unpreferably becomes inferior in coatings. Further, the number in a polymer block unit having two-substituted-, three-substituted-, and four-substituted-epoxygroup in the block A is larger than that in the block B.

Some specific examples in the Formula (a) are exemplified hereinafter. $(A—B)_1$ is a diblock polymer composed of the block A and the block B, and does not include Y.

$(A—B)_1YB_1$ is a diblock polymer composed of the block A and the block B, and the block B is separated into two by Y which is a bifunctional coupling agent or an initiator.

$(A—B)_2Y$ is a linear polymer A—B—Y—B—A, and a diblock copolymer A—B is coupled by Y.

$(A—B)_2$ is a linear polymer A—B—B—A, and prepared by a successive addition of respective block monomers, A, B, B, and A, and does not include Y.

$(A—B)_4Y$ is a symmetrical radial block copolymer, and Y is usually a tetrafunctional coupling agent.

$(A—B)_2YB_2$ is an unsymmetrical radial block copolymer.

$(A—B)_{20}Y$ is a symmetrical star-shaped block copolymer, and Y is a multifunctional monomer which is obtained by divinyl benzene (DVB), etc.

$(A—B)_3YB_{17}$ is an unsymmetrical star-shaped block copolymer which is obtained by the addition of a monomer B and an alkyl lithium after polymerization of the block A. A living diblock polymer A—B and a block polymer B are coupled by an appropriate reagent such as divinylbenzene. A product at this time is a mixture of molecules having a variety of structures, and a statistical structure is $(A—B)_3YB_{17}$ on an average.

$(A—B)_{20}Y(A—B)_{20}$ is an unsymmetrical star-shaped polymer. It is firstly obtained by coupling 20 A—B diblock polymers with a small amount of a coupling monomer such as divinylbenzene, etc., and then an A type monomer is added, followed by adding a B type monomer before terminating a living polymerization system by a proton donor. In this case, Y has two roles as a coupling agent and a multifunctional initiator.

There can be employed a variety of coupling agents. There can be employed every multifunctional coupling agents which have at least 2 reacting points. This kind of compounds to be employed include polyepoxy compounds, polyisocyanate compounds, polyimine compounds, polyaldehyde compounds, polyketone compounds, polyacid anhydrides, polyesters, and polyhalides, etc. The compounds may be at least 2 functional compounds such as a combination of epoxides with aldehydes, and isocyanates with halides. In the case that the coupling agent has 2 reacting points such as dibromoethane, a polymer has a linear ABA structure. In the case that the coupling agent has 3 or more reacting points such as silicone tetrachloride, a polymer has a branched structure such as $(AB)_nY$. Divinylbenzene is most usually employed as a coupling monomer by which a star-shaped polymer is produced.

In the composition of the present invention, the weight ratio of the component (a)/the component (b) ranges from 95/5 to 40/60. In the case of not more than 95/4, an effect for impact resistance and flexibility cannot be sufficiently obtained and, in the case of not less than 40/60, curability is poor and, further, a sufficient coating layer cannot be unpreferably obtained.

Although a method for preparing the composition of the present invention is not particularly limited, it is preferred to mix while melting with a reaction vessel equipped with a heating device and an agitating device, and a melt kneader such as a Banbury mixer and an extruder.

In the case that the composition of the present invention is employed as a powder coating, curing agents are not particularly limited, and there can be employed, for example, novolak type phenol resins, dicyandiamide, imidazoles, hydrazides, aromatic amines, and acid anhydrides, etc. which are usually employed.

In the case that the composition of the present invention is employed as a powder coating, there can be added extenders, fluidizing agent, reinforcing materials, fillers, and pigments. As examples of the additives, there can be exemplified fiberglass, asbestos fibers, carbon fibers, powdered polyethylenes, powdered quarts, mineral silicates, powdered asbestos and powdered slate, kaoline, aluminum oxide, aluminum hydroxide, antimony trioxide, silica, titanium dioxide, carbonblack, coloring pigments which are oxides, powdered metals and polyester resins, and acrylic resins, etc.

In the case that the composition of the present invention is employed as a powder coating, a method for preparing the powder coating may be a method for preparing conventional powder coatings and, the epoxy resin composition of the present invention, a curing agent and additives required are mixed by kneading while melting with, for example, a conventional kneader and extruder, etc., in conditions of temperature and time (usually, 50° C. to 160° C., and 3 to 60 seconds) at which an increase of viscosity and a gelation phenomenon are not caused, followed by being crushed and sieved with a classifier after cooling to obtain a powder coating having a desired particle size distribution. Desired particle size in the powder coating, in general, desirably ranges from 1 to 80 microns or so.

Uses for a powder coating in which the composition of the present invention is employed are not particularly limited, and it can be widely employed in a powder coating process for materials in engineering and construction, home electric appliances, heavy electricity equipments, materials for roads, steel furniture, parts for automobiles, and materials for water supplying, etc.

EXAMPLE

Hereinafter, although the present invention is further illustrated in detail by Examples and Comparative Examples, the present invention is in no way meant to be limited by the Examples.

In respective Examples and Comparative Examples, there were employed solid epoxy resms and epoxidized polydiene polymers described below.

Solid Epoxy Resin

As solid epoxy resins, bisphenol A type epoxy resins, EPIKOTE 1004 (hereinafter"E-1004") and EPIKOTE 1003F (hereinafter"E-1003F") were employed, which are manufactured by Yuka Shell Epoxy Co., Ltd. As properties, E-1004 has an epoxy equivalent of 915 g/eq and a softening point of 98° C., and E-1003F has an epoxy equivalent of 747 g/eq and a softening point of 93° C.

Epoxidized Polydiene Polymer

As epoxidized polydiene polymers, there were employed Liquid KRATON Polymers EKP-206 and EKP-207 which are manufactured by Shell Kagaku, Ltd. EKP-206 is an epoxidized polydiene polymer in which a linear diblock polymer composed of an isoprene homopolymer block-a styrene/butadiene copolymer block is partially hydrogenated and epoxidized until a level of 1.49 milli-equivalent (1.49 meq/g) based on 1 g of the polymer, and EKP-207 is an epoxidized polydiene polymer in which a linear diblock polymer composed of an isoprene homopolymer block-a butadiene polymer is partially hydrogenated and epoxidized until a level of 1.49 milli-equivalent (1.49 meq/g) based on 1 g of the polymer. Properties of EKP-206 and EKP-207 are shown in Table 1.

TABLE 1

| | EKP-206 | EKP-207 |
|---|---|---|
| Epoxy equivalent (g/eq) | 670 | 670 |
| Hydroxyl group equivalent (g/eq) | 6000 | 6000 |
| Average epoxy group contents per one molecule (piece) | 9 | 9 |
| Tg (° C.) | −15 | −53 |

EXAMPLE 1

As a solid epoxy resin, there was employed a bisphenol A type epoxy resin, EPIKOTE 1004 (hereinafter "E-1004")

manufactured by Yuka Shell Epoxy Co., Ltd., and as an epoxidized polydiene polymer, there was employed Liquid KRATON Polymer EKP-206 manufactured by Shell Kagaku, Ltd. There were mixed 90 parts by weight of the solid epoxy resin and 10 parts by weight of the epoxidized polydiene polymer, followed by kneading at 100° C. for 10 minutes with a triple-rolls machine. Mixture was crushed with a hammer mill after cooling to obtain a powder-like epoxy resin composition primarily containing particles having sizes of 150 to 250 mesh by a standard sieve.

EXAMPLE 2

The same procedures as in the Example 1 were followed except that there were employed 80 parts by weight of E-1004 as a solid epoxy resin, and 20 parts by weight of EKP-206 as an epoxidized polydiene polymer to obtain a powder-like epoxy resin composition.

EXAMPLE 3

The same procedures as in the Example 1 were followed except that there were employed 70 parts by weight of E-1004 as a solid epoxy resin, and 30 parts by weight of EKP-206 as an epoxidized polydiene polymer to obtain a powder-like epoxy resin composition.

EXAMPLE 4

The same procedures as in the Example 1 were followed except that there were employed 60 parts by weight of E-1004 as a solid epoxy resin, and 40 parts by weight of EKP-206 as an epoxidized polydiene polymer to obtain a powder-like epoxy resin composition.

EXAMPLE 5

The same procedures as in the Example 1 were followed except that there were employed 80 parts by weight of E-1004 as a solid epoxy resin, and 20 parts by weight of EKP-207 as an epoxidized polydiene polymer to obtain a powder-like epoxy resin composition.

EXAMPLE 6

The same procedures as in the Example 1 were followed except that there were employed 80 parts by weight of E-1003F as a solid epoxy resin, and 20 parts by weight of EKP-206 as an epoxidized polydiene polymer to obtain a powder-like epoxy resin composition.

EXAMPLE 7

The same procedures as in the Example 1 were followed except that there were employed 75 parts by weight of E-1004 as a solid epoxy resin, and 25 parts by weight of EKP-206 as an epoxidized polydiene polymer to obtain a powder-like epoxy resin composition.

COMPARATIVE EXAMPLE 1

E-1004 was solely crushed with a hammer mill to prepare powders primarily having particle size of 150 to 250 mesh by a standard sieve.

COMPARATIVE EXAMPLE 2

The same procedures as in the Example 1 were followed except that there were employed 30 parts by weight of E-1004 as a solid epoxy resin, and 70 parts by weight of EKP-206 as an epoxidized polydiene polymer to obtain a powder-like epoxy resin composition.

COMPARATIVE EXAMPLE 3

E-1003F was solely crushed with a hammer mill to prepare powders primarily having particle size of 150 to 250 mesh by a standard sieve.

Powder coatings were prepared from the epoxy resin compositions in Examples 1 to 7 and Comparative Examples 1 to 3 according to methods for the preparation of powder coatings described below, and there was carried out a storage stability test for coatings (a test for a blocking resistance). The results are shown in Table 2.

Preparation of Powder Coatings

The epoxy resin compositions in Examples 1 to 7 and Comparative Examples 1 to 3 were mixed with a curing agent, an accelerator for curing, an inorganic filler, and a fluidity controller according to the formulation in Table 2, followed by dry blending with a Super Mixer and by melt kneading at a barrel temperature of 110° C. and retention time of 20 seconds with a twin-screw extruder MP-2015 manufactured by APV Chemical Machinery, Ltd.

After cooling a mixture kneaded, it was crushed with a hammer mill to obtain powders primarily containing particle size of 150 to 250 mesh by a standard sieve.

Storage Stability Test for Coatings (a Test for a Blocking Resistance)

The respective powder coatings prepared as described hereinabove were placed at 40° C. in a thermostatically-controlledbox for 1 week, followed by visually observing the presence or absence of blocking in the coatings.

Further, using the powder coatings prepared as described hereinabove, there were prepared test pieces for coating layers according to the respective methods as described below, and there was carried out a coating layers test as described below. The results are shown in Table 2.

Preparation of Pieces for a Coating Layers Test

Pieces for a coating layers test were prepared according to JIS K5400. That is, there were employed steel plates having the size of 150×70×0.8 mm in an Erichsen test, an adhesion test, and a spray test for a salt water resistance, there were employed steel plates having 150×50×0.3 mm in a test for bending resistance, and there were employed steel plates having 200×100×0.6 mm in a Dupon't type impact resistance test as test plates, respectively, which were in advance processed according to descriptions in JIS K5400. Of those, in the test plates for the spray test for a salt water resistance, a paint for preventing stains was coated at the back side and dried. The test plates were in advance heated at 180° C. to 200° C., followed by coating the powder coatings prepared by the above-mentioned methods with an electrostatic coating machine. The test plates coated were post cured at 200° C. for 10 minutes to obtain pieces for the coating layers test having the thickness of 180$\mu$ to 220$\mu$.

Coating Layer Test

Coating layers test described below was carried out with the above-mentioned pieces for the coating layers test according to JIS K5400.

a. Erichsen Test

Using an Erichsen tester, a steel ball is thrust from the backside of the test piece to deform a coating layer, and there is recorded a thrust length when cracks and stripping are caused in the coating layer. The larger value in the thrust length means the more excellent.

b. Adhesion Test (a Cross-hatched Test)

Using a cutter, cut lines are formed until attaining to the surface of the test pieces through the coating layer to make 100 pieces of cross-hatched cut lines. A cellophane-made sticky tape is strongly adhered to the cross-hatched cut lines. The number "n" of the cross-hatched coating layers remained on the test pieces after strongly stripping the tape is recorded as "n"/100. The larger value of "n" means the more excellent.

c. Bending Resistance Test

Using a bending test machine described in JIS K5400, the back surface of the test pieces is bent along spindles having a variety of diameters. There is recorded a minimum diameter in the spindles in which cracks and stripping are not caused on the coating layers. The smaller value in the diameter means the more excellent.

d. Dupon't Type Impact Resistance Test

Using a Dupon't type impact resistance tester, a weight having the weight of 500 g is dropped from a fixed height, and there is recorded a maximum height in which cracks and stripping are not caused on the coating layers. The larger value in the height means the more excellent.

e. Spray Test for a Salt Water Resistance

Using a spraying apparatus prescribed in JIS Z2371, a spray test is carried out for 500 hours under spray test conditions of a salt water resistance described in JIS K5400, followed by visually observing and recording the presence or absence and a level of stains on the coating layers, and swelling and stripping on the coating layers.

TABLE 2

| | | Example | | | | | | |
|---|---|---|---|---|---|---|---|---|
| | | 1 | 2 | 3 | 4 | 5 | 6 | 7 |
| Solid epoxy resin | E1004 | 90 | 80 | 70 | 60 | 80 | | 75 |
| | E1003F | | | | | | 80 | |
| Epoxidized polydiene polymer | EKP206 | 10 | 20 | 30 | 40 | | 20 | 25 |
| | EKP207 | | | | | 20 | | |
| Curing agent | Dicyan diamide | 4 | 4 | 4 | 4 | 4 | 4 | |
| | Trimellitic anhydride | | | | | | | 15 |
| | 2-methylimidazole | 0.2 | 0.2 | 0.2 | 0.2 | 0.2 | 0.2 | |
| | Titanium oxide having Lutile structure | 40 | 40 | 40 | 40 | 40 | 40 | 40 |
| Acronal 4F | | 1 | 1 | 1 | 1 | 1 | 1 | 1 |
| Stability in coatings (blocking resistance) of blocking | | Normal | Normal | Normal | Normal | Normal | Normal | Normal |
| Properties of coating layer at 25° C. | Erichsen (mm) | 8 | 9 | 10 or more | 10 or more | 9 | 9 | 7 |
| | Adhesion | 100/100 | 100/100 | 100/100 | 100/100 | 100/100 | 100/100 | 100/100 |
| | Bending processability (mm phi) | 4 | 4 | 4 | 2 or less | 4 | 4 | 4 |
| | Dupon't impact (cm) | 50 or more | 50 or more | 50 or more | 50 or more | 50 or more | 50 or more | 50 or more |
| | Spraying of salt water | Normal | Normal | Normal | Normal | Normal | Normal | Normal |

| | | Comparative Example | | |
|---|---|---|---|---|
| | | 1 | 2 | 3 |
| Solid epoxy resin | E1004 | 100 | 30 | |
| | E1003F | | | 100 |
| Epoxidized polydiene polymer | EKP206 | | 70 | |
| | EKP207 | | | |
| Curing agent | Dicyan diamide | 4 | 4 | 4 |
| | Trimellitic anhydride | | | |
| | 2-methylimidazole | 0.2 | 0.2 | 0.2 |
| | Titanium oxide having Lutile structure | 40 | 40 | 40 |
| Acronal 4F | | 1 | 1 | 1 |
| Stability in coatings (blocking resistance) | | Normal | Genera-tion of blocking | Normal |
| Properties of coating layer at 25° C. | Erichsen (mm) | 3 | 10 or more | 3 |
| | Adhesion | 100/100 | 70/100 | 100/100 |
| | Bending processability (mm phi) | 10 or more | 2 or less | 10 or more |
| | Dupon't impact (cm) | 20 | 50 or more | 20 |
| | Spraying of salt water | Normal | stripping of coat-ing layer, genera-tion of strains | Normal |

Coating layers prepared from powder coatings in which there is employed the composition in the present invention can exhibit an excellent flexibility and impact resistance, and also excellent adhesion, water resistance, and corrosion resistance.

What is claimed is:

1. An epoxy resin powder coating composition which comprises: (a) 40 to 95 parts by weight of a solid epoxy resin having at least 2 epoxy groups in a molecule, an epoxy equivalent of 400 to 2500, and a softening point of 50° C. to 150° C., and (b) 5 to 60 parts by weight of an epoxidized polydiene polymer having a main structure of Formula (I):

$$(A—B—Ap)n—Yr—(Aq—B)m \qquad (I)$$

in which aliphatic double bonds are partially epoxidized wherein in Formula I, Y is a coupling agent, a monomer for coupling, or an initiator, A is a polymer block selected from a homopolymer block of a conjugated diolefine monomer, a copolymer block of a conjugated diolefine monomer, a copolymer block composed of a conjugated diolefine monomer and an aromatic hydrocarbon monomer having one alkenyl group, B is a polymer block selected from a homopolymer block of an aromatic hydrocarbon monomer having one alkenyl group or a copolymer block thereof, or a copolymer block composed of an aromatic hydrocarbon having one alkenyl group and a conjugated diolefine monomer, n is not less than 0, r is 0 or 1, m is 0 or more, and the total of n and m is 1–100, and p and q are 0 or 1.

2. The epoxy resin composition of claim 1 wherein said solid epoxy resin is a polyglycidyl ether obtained by allowing to react an aromatic compound having at least 2 hydroxyl groups with epichlorohydrin under an alkaline reaction condition, or an epoxy resin at least 2 epoxy groups obtained by addition polymerizing an epoxy resin having at least 2 epoxy groups, an epoxy equivalent of 160 to 400, and a molecular weight of from 300 to 800 with an aromatic compound having at least 2 hydroxyl groups in the presence of a catalyst.

3. The epoxy resin composition of claim 1 wherein said epoxidized polydiene polymer has 0.1 to 3 milli-equivalent of epoxy groups based on 1 g of the polymer and, further, the number in a polymer block unit of two-substituted-, three-substituted-, and four-substituted-epoxy groups in the A block is larger than that in the B block.

4. The epoxy resin composition of claim 1 wherein said epoxidized polydiene polymer is an epoxidized polydiene polymer having 0.1 to 3 milli-equivalentof aliphatic double bonds based on 1 g of the polymer, and which is partially hydrogenated before epoxidation.

5. The epoxy resin composition of claim 1 wherein said aliphatic double bonds in said epoxidized polydiene polymer are hydrogenated until not more than 0.5 milli-equivalent based on 1 g of the polymer, and epoxidized.

6. The epoxy resin composition of claim 2 wherein said epoxidized polydiene polymer has 0.1 to 3 milli-equivalent of epoxy groups based on 1 g of the polymer and, further, the number in a polymer block unit of two-substituted-, three-substituted-, and four-substituted-epoxy group in the A block is larger than that in the B block.

7. The epoxy resin composition of claim 2 wherein said epoxidized polydiene polymer is an epoxidized polydiene polymer having 0.1 to 3 milli-equivalent of aliphatic double bonds based on 1 g of the polymer, and which is partially hydrogenated before epoxidation.

8. The epoxy resin composition of claim 3 wherein said epoxidized polydiene polymer is an epoxidized polydiene polymer having 0.1 to 3 milli-equivalent of aliphatic double bonds based on 1 g of the polymer, and which is partially hydrogenated before epoxidation.

9. The epoxy resin composition of claim 6 wherein said epoxidized polydiene polymer is an epoxidized polydiene polymer having 0.1 to 3 milli-equivalent of aliphatic double bonds based on 1 g of the polymer, and which is partially hydrogenated before epoxidation.

10. The epoxy resin composition of claim 2 wherein said aliphatic double bonds in said epoxidized polydiene polymer are hydrogenated until not more than 0.5 milli-equivalent based on 1 g of the polymer, and epoxidized.

11. The epoxy resin composition of claim 3 wherein said aliphatic double bonds in said epoxidized polydiene polymer are hydrogenated until not more than 0.5 milli-equivalent based on 1 g of the polymer, and epoxidized.

12. The epoxy resin composition of claim 4 wherein said aliphatic double bonds in said epoxidized polydiene polymer are hydrogenated until not more than 0.5 milli-equivalent based on 1 g of the polymer, and epoxidized.

13. The epoxy resin composition of claim 6 wherein said aliphatic double bonds in said epoxidized polydiene polymer are hydrogenated until not more than 0.5 milli-equivalent based on 1 g of the polymer, and epoxidized.

14. The epoxy resin composition of claim 7 wherein said aliphatic double bonds in said epoxidized polydiene polymer are hydrogenated until not more than 0.5 milli-equivalent based on 1 g of the polymer, and epoxidized.

15. The epoxy resin composition of claim 8 wherein said aliphatic double bonds in said epoxidized polydiene polymer are hydrogenated until not more than 0.5 milli-equivalent based on 1 g of the polymer, and epoxidized.

16. The epoxy resin powder coating composition of claim 9 wherein said aliphatic double bonds in said epoxidized polydiene polymer are hydrogenated until not more than 0.5 milli-equivalent based on 1 g of the polymer, and epoxidized.

* * * * *